March 2, 1965     J. C. LARSON ETAL     3,171,617
CONTROL APPARATUS FOR AIRCRAFT Filed Oct. 30, 1962     2 Sheets-Sheet 1

INVENTORS
DAVID P. NELSON
BY JOHN C. LARSON

*Gordon Reed*

ATTORNEY

INVENTOR.
DAVID P. NELSON
BY JOHN C. LARSON

ATTORNEY

United States Patent Office 3,171,617
Patented Mar. 2, 1965

3,171,617
CONTROL APPARATUS FOR AIRCRAFT
John C. Larson and David P. Nelson, Minneapolis, Minn.,
assignors to Honeywell Inc., a corporation of Delaware
Filed Oct. 30, 1962, Ser. No. 234,044
7 Claims. (Cl. 244—77)

This invention relates to control apparatus of the type for maintaining a condition and more particularly relates to control apparatus for maintaining a condition of a moving steerable craft such as an aircraft. In the present instance, the condition being maintained is the air speed of the craft in terms of Mach number. The control apparatus is somewhat conventional in maintaining a desired condition, utilizing both a condition error signal and a condition error rate signal. In respect to being conventional, it is old in the U.S. patent to Weber 2,944,768 to provide a selected Mach hold mode in an automatic pilot for an aircraft, and maintaining the selected Mach by the use, among other signals, of a Mach error signal and a Mach error rate signal. However, the present invention relates to providing a Mach error rate effect for the control system of the above type by means of a computed Mach rate signal rather than providing the rate effect through a Mach rate sensor.

When the autopilot-aircraft is on a Mach hold mode, wherein the airspeed in Mach number is to be maintained, excessive pitch activity of the aircraft may result due to a noisy sensed Mach rate signal. The invention herein is the development of an unusually noise free Mach rate signal by a computational process involving blending Mach error signals and pitch attitude signals both of which are displacement type signals.

Another object of the invention is to maintain the speed of an aircraft in terms of Mach using as a control signal the computed Mach rate signal.

Other objects and features of the invention will become apparent from the following description of the invention when considered in relation to the accompanying drawings wherein.

Figure 1:
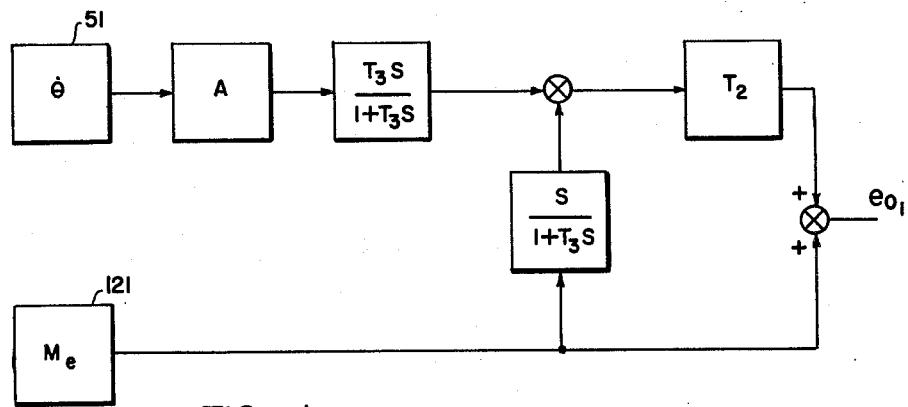
FIGURE 1 is a block diagram of a computing system blending Mach error, $M_e$, and pitch attitude $\theta$, signals to produce $e_{o_1}$ the Mach hold outer loop feedback transfer function, $(1+T_2S)M_e$, required which system is to be simulated.

As stated, it is well known that a rate signal such as a condition change rate signal is utilized to provide damping a condition stabilizing control system. Such rate signal is used when the condition stabilized is Mach of an aircraft. However, with the conventional sensed Mach rate signal in the automatic Mach stabilizing system for aircraft being dispensed with here, because of the inclusion of unwanted noise in its signal, it is necessary herein to develop from other aircraft responses and relationships free of detrimental noise, a signal having Mach rate characteristics or effects.

In the development of such a Mach rate effect for use in a Mach stabilizing system for craft, the Mach error signal, $M_e$, basic to Mach stabilization control of a moving aircraft and comparatively free of detrimental noise, is selected as one signal to be used; the other signal free of detrimental noise chosen to be used to develop Mach rate is pitch attitude. The relationship between Mach rate $\dot{M}$ and pitch attitude error, $\theta$, will be considered hereinafter.

To now begin with the development of a Mach rate effect we utilize a similar notation as used in the U.S. patent to Jude et al. 2,842,324 wherein the angle of attack, $\alpha$, is the angle roughly between the chord of the wing of an aircraft and the relative wind. Pitch attitude, $\theta$, is the attitude between the horizontal and the chord of the wing. In some instances, the line defined by the chord of the wing is similar to the fuselage fore and aft axis mentioned in the patent to Jude et al. Flight path angle, $\gamma$, is the angle between the horizontal and the relative wind and equals $\theta-\alpha$. Therefore, $\alpha=\theta-\gamma$, and (1) $$\frac{\alpha}{\theta}=1-\frac{\gamma}{\theta}$$

The simplified flight path angle response to an attitude change is (2) $$\frac{\gamma}{\theta}=\frac{1}{1+T_aS}$$

where $T_a$ is the time constant of the aircraft in response to elevator deflection, and S is the conventional mathematical of LaPlace operator.

Substituting Equation 2 into Equation 1

(3) $$\frac{\alpha}{\theta}=1-\frac{1}{1+T_aS}=\frac{T_aS}{1+T_aS}$$

For aircraft air speed or Mach stabilization control purposes through elevator operation, it is assumed at the control frequencies involved, air speed change rates depends upon attitude and angle of attack changes. The control frequencies are frequencies which are near the frequency of the combined automatic pilot and aircraft. Attitude and angle of attack changes may occur much more rapidly than air speed changes themselves and therefore alpha and theta have a more significant effect on the rate of change of air speed than air speed change itself at the control frequencies. Therefore the acceleration due to the air speed change term in Equation 4 below has been neglected. Later it will be found that only the higher frequency portion of the composite control signal is made up from this derived signal which further justifies the neglecting of this term in the derivations to follow. However, at lower frequencies, the air speed deviation is then important in determining the rate of change of air speed and cannot be neglected.

(4) $$\dot{U}=-g\theta+X_\alpha\alpha+X_u u$$

wherein $X_u u$=change in acceleration along the X axis of the aircraft due to a change in forward velocity, $u$, with $X_u u$ being neglected, where $X_\alpha$ is the change in force per unit of mass along the X axis due to a change in $\alpha$ and is also referred to as a stability derivative, and $g$ is the acceleration due to gravity, 32.2 feet per second squared, while $\dot{U}$ is the rate of change in forward velocity, i.e., longitudinal acceleration. Therefore, (5) $$\frac{\dot{U}}{\theta}=-g+X_\alpha\frac{\alpha}{\theta}$$

Combining Equations 3 and 5

$$\frac{\dot{U}}{\alpha}=-g+X_\alpha\frac{T_aS}{1+T_aS}=\frac{-g(1+T_aS)+X_\alpha T_aS}{1+T_aS}$$

(6) $$\frac{\dot{U}}{\theta}=-g\frac{1+\left(1-\frac{X_\alpha}{g}\right)T_aS}{1+T_aS}$$

In terms of Mach rate $\dot{M}$ Equation 6 can be rewritten:

$$(7) \quad \frac{\dot{M}}{\theta}=-\frac{g}{a}\frac{1+\left(1-\frac{X_\alpha}{g}\right)T_a S}{1+T_a S}$$

approximately where $$\frac{\dot{U}}{a}=\dot{M}$$

where $a$ is the velocity of sound, and Mach number is the ratio of true air speed to the speed of sound at the flight condition, and $\theta$ is the pitch attitude angle in radians.

Placing $$\left(1-\frac{X_\alpha}{g}\right)T_a = T_1$$

$$(8) \quad \frac{\dot{M}}{\theta}=-\frac{g}{a}\frac{1+T_1 S}{1+T_a S}$$

Equation 8, then, is the relationship between computed or developed Mach rate and pitch attitude and will be referred to later.

We now establish the following mathematical computing system in FIGURE 1, which blends Mach error and pitch attitude signals to produce the outer loop feedback transfer function referred to previously, defined as $(1+T_2 S)$, which includes the damping feedback effect required for Mach stabilization. The attitude gyro 51 and Mach sensor 121 are so identified also in FIGURES 2 and 3.

In the block diagram of FIGURE 1 where:

$$A=\frac{\dot{M}}{\theta}=-\frac{g}{a}\frac{1+T_1 S}{1+T_a S}$$

from 8

$T_2=$ derived Mach rate signal gain constant
$T_3=$ signal blending time constant By conventional servomechanism analysis means: the Mach control signal $$(9) \quad e_{o_1}=M_e+T_2\left(\frac{S}{1+T_3 S}M_e+\frac{T_3 S}{1+T_3 S}A\theta\right)$$

$$e_{o_1}=M_e+T_2\left(\frac{S}{1+T_3 S}M_e+\frac{T_3 S}{1+T_3 S}\frac{\dot{M}}{\theta}\theta\right)$$

since $\dot{M}=A\theta$ $$e_{o_1}=M_e+T_2\left(\frac{\dot{M}}{1+T_3 S}+\frac{T_3 S M}{1+T_3 S}\right)$$

since $\dot{M}=SM_e$ $$e_{o_1}=M_e+T_2\dot{M}\left(\frac{1+T_3 S}{1+T_3 S}\right)$$

$$(10) \quad e_{o_1}=M_e+T_2\dot{M}=(1+T_2 S)M_e$$

$\dot{M}$ or Mach rate has been thus developed from $\theta$ and $M_e$.

Figure 2:
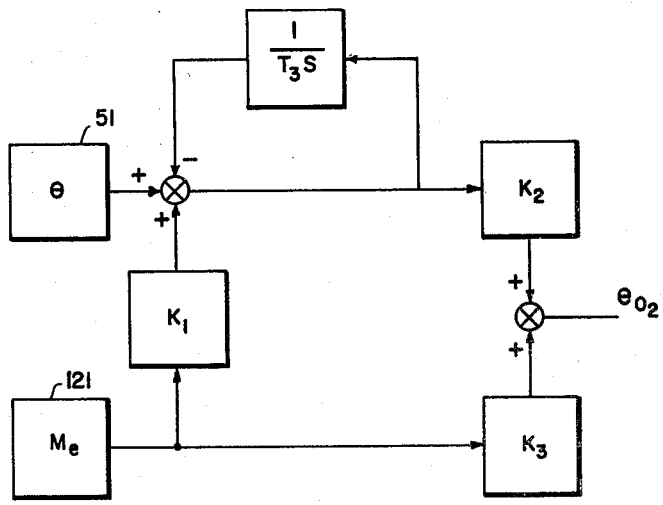
FIGURE 2 is a block diagram of the proposed mechanized system which system approximates the system of FIGURE 1 wherein Mach error and pitch attitude signals are blended together by means of an existing autopilot bridge synchronizer and gains $K_1$, $K_2$, and $K_3$.

FIGURE 2 is a block diagram of the proposed mechanized system or mechanical embodiment using an existing pitch signal bridge synchronizer such as synchronizer 31, FIGURE 1 of U.S. Patent No. 2,851,645, FIGURE 2, simulates the system of FIGURE 1 (other mechanizations are possible) wherein Mach error and pitch attitude error are blended together by means of the pitch channel motor type synchronizer and utilizing gains $K_1$, $K_2$, and $K_3$. Such synchronizer is conventionally used to balance the automatic pilot pitch channel signal system while the automatic control system is disengaged from control of the aircraft, see Owens 2,851,645 for example.

In FIGURE 2 and again from conventional servomechanism analysis:

$$(11) \quad e_{o_2}=K_3 M_e+K_2\left(\frac{T_3 S}{1+T_3 S}K_1 M_e+\frac{T_3 S}{1+T_3 S}\theta\right)$$

where $T_3$ is the time constant of the motor type synchronizer nominally 3 seconds and $K_1$, $K_2$, and $K_3$ are gains to be correctly adjusted.

Rewriting Equations 9 and 11 so that the coefficients of $M_e$ and $\theta$ can be equated to make FIGURE 2 dynamically similar to FIGURE 1 we have from 9

$$(12) \quad e_{o_1}=\frac{[1+(T_2+T_3)S]}{1+T_3 S}M_e+\frac{T_2 A T_3 S}{1+T_3 S}\theta$$

and from 11

$$(13) \quad e_{o_2}=\frac{K_3+T_3(K_3+K_2 K_1)S}{1+T_3 S}M_e+\frac{K_2 T_3 S}{1+T_3 S}\theta$$

Now $e_{o2}$ will equal $e_{o1}$, the desired output, if $$(14) \quad K_3+T_3(K_3+K_2 K_1)S=1+(T_2+T_3)S$$

and $$(15) \quad K_2 T_3 = T_2 A T_3$$

Solving for gains $K_1$, $K_2$, and $K_3$, we have:

$$(16) \quad K_3=1$$

by inspection of FIGURES 1 and 2, since $M_e$ is not varied.

$$(17) \quad K_2=T_2 A$$

and recalling $$A=\frac{\dot{M}}{\theta}, K_2=\frac{T_2 \dot{M}}{\theta}$$

$$(18) \quad K_1=1/T_3 A$$

The dimensions of $K_1$, $K_2$, and $K_3$ are:

$$K_3=\text{Mach/Mach}$$

by inspection of FIGURE 2.

$$K_2=\text{sec.}\times\frac{\text{Mach/sec.}}{\text{deg.}}=\text{Mach/deg.}$$

$$K_1=\frac{1}{\text{sec.}\cdot\frac{\text{Mach/sec.}}{\text{deg.}}}=\text{deg./Mach}$$

Therefore, when gains $K_1$, $K_2$, and $K_3$ are correctly adjusted in the blending circuit of FIGURE 2, the Mach hold output signal $e_{o2}$ is dynamically equal to the desired outer loop output $e_{o1}$, i.e. $(1+T_2 S)M_e$, where $$T_2 S M_e = T_2 \dot{M}$$

the damping feedback.

To establish actual values of $K_1$, and $K_2$ over an aircraft operation range of a typical flight regime the characteristics of the autopilot-aircraft Mach control system need to be specified. The following considerations reveal how, with a system's characteristics specified, $K_1$, and $K_2$, are given such actual values.

Referring back, both $T_1$ and $T_a$ see 8, vary with speed and altitude. But, it is to be noted that, over the flight regime, because of the approximate values of $T_1$ and $T_a$, and the low frequencies experienced under Mach control, the ratio $$\frac{1+T_1 S}{1+T_a S}$$

approximates unity, and therefore, we can neglect this dynamic ratio. The above mentioned close operational approximation through 8 becomes:

$$(19) \quad \frac{\dot{M}}{\theta}=\frac{g}{a}$$

and if $\theta$ is expressed in degrees:

$$(20) \quad \frac{\dot{M}}{\theta}=\frac{g}{57.3a}$$

Now setting the time constant $T_3$ of the synchronizer 79

$$\frac{1}{T_3 S}$$

FIGURE 2, e.g., three seconds, and the value of $a$, e.g., 1000 feet per second, and applying Equations 17 and 19, the gains $K_1$ and $K_2$ become:

$$K_1 = \frac{1}{T_3 A} = -\frac{57.3a}{3g} = -595°$$

or approximately −600

Figure 3:
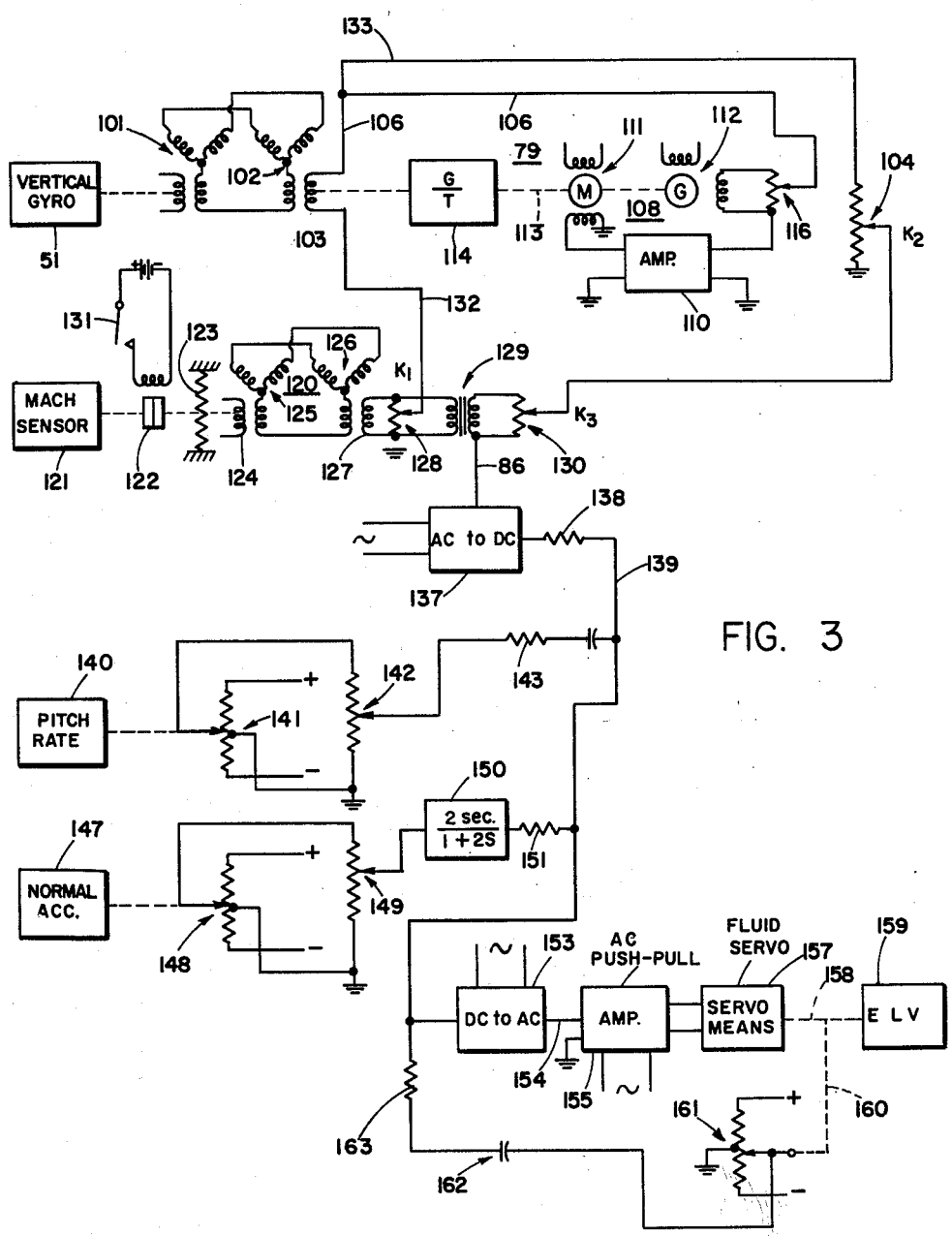
FIGURE 3 is an electrical schematic of the overall aircraft control apparatus using Mach, computed Mach rate, and normal acceleration control signals.

FIGURE 3 shows a simplified electrical schematic of an elevator control system embodying the novel subject matter for operating an elevator control surface of an aircraft. The control system of FIGURE 3 includes a vertical gyroscope 51 which senses changes in pitch attitude of the aircraft and drives an A.C. electrical signal generator comprising a first synchro 101 having a rotor winding energized from a source of A.C. voltage and operated by the gyro and the stator winding connected to a similar stator winding of the second synchro 102 having a control transformer winding 103. The output from winding 103 is supplied through conductor 106 to an amplifier 110 and alternatively operable of synchronizing or cancelling arrangement 108. The amplifier 110 in turn controls the operation of an induction motor 111 which drives a velocity signal generator 112 through its operating shaft 113 and also through a reduction gear train 114 drives the control transformer winding 103 to null the signal output therefrom. The output from velocity signal generator 112 appearing across resistor 116 is in series opposition to the signal voltage on conductor 106 to damp the rotation of motor 111. The motor rate during synchronizing is greater than the motor rate during cancelling of steady state signals.

The system also includes a source of Mach signal comprising a Mach error sensor 121 which through a selectively energized magnetic clutch 122 operates a rotor winding 124 of a synchro having a stator winding 125. The winding 124 as slider 105 in Weber 2,944,768, is biased to non-signal or normal position by centering spring means 123 upon the deenergization of clutch 122. Winding 124 comprises a portion of a synchrotype signal source 120 having a second stator winding 126 connected to stator winding 125. Coacting with stator winding 126 is a winding 127 of a control transformer having its output supplied in one instance across a gain control potentiometer 128 referred to also as $K_1$. The output of control transformer 127 is also supplied through an isolating transformer 129 across a second gain potentiometer 130 referred to also as $K_3$. The output from potentiometer 128 is supplied through conductor 132 in electrical series summing with the signal voltage from winding 103. The arrangement therefore is such that the synchronizing arrangement 108 during cancelling after a period of time depending upon its time constant (which is adjusted from generator potentiometer 116) by positioning the control transformer winding 103 nulls the control signal on its amplifier 110.

The output occurring on conductor 106 is also supplied to a conductor 133 in parallel therewith and through a first gain potentiometer 104 ($K_2$). The output from potentiometer 104 is combined with that from a potentiometer 130 and the resultant is applied to an A.C. to D.C. voltage converter 137. The output from converter 137 goes through a summing resistor 138 to a summing conductor 139 of a D.C. signal parallel summing control bridge or network. It will be understood that the gain adjust potentiometers $K_1$, $K_2$, and $K_3$ are adjusted in accordance with the requirements of the arrangement of FIGURE 2.

Further control signal voltages are applied to summing conductor 139. One such signal is supplied from a pitch rate sensing device 140 which may be a pitch rate gyroscope sensing craft pitch rate about its lateral axis which operates a slider of potentiometer 141 energized from a D.C. supply. The output from potentiometer 141 is supplied across a gain adjust potentiometer 142 from which the pitch rate signal is supplied through summing resistor 143 and high pass condenser to conductor 139.

Another control signal supplied to conductor 139 is that provided through a normal accelerometer 147 as an inner loop control in lieu of pitch attitude error and sensing craft vertical acceleration in the existing attitude of the craft. The normal accelerometer 147 operates the slider of a D.C. energized potentiometer 148 to provide a normal acceleration signal, and the signal from potentiometer 148 is supplied to a normal acceleration adjust potentiometer 149 to vary the magnitude of the signal developed in potentiometer 148 to be transmitted. The output from gain adjust potentiometer 149 is supplied through a lag network 150, which may be of the resistor-capacitor type, and summing resistor 151 to the summing conductor 139.

A servo operated follow up or network rebalance signal is provided through a follow up potentiometer 161 which is connected through a high pass network 162 and summing resistor 163 to summing conductor 139. The servo feedback network 162 functions in a similar manner in the present arrangement with respect to D.C. signals that the synchronizer or canceller 108 does with respect to A.C. signals in that it cancels steady state signals. It functions to provide a proportional plus integral servo operation.

The D.C. signals supplied to summing conductor 139 provide a resultant signal to a D.C. to A.C. converter 153 which has its A.C. output supplied over transmission means 154 to an A.C. operated push-pull type amplifier 155. The amplifier 155 controls the position or displacement from a normal position of a control valve (not shown) of a fluid type servomotor 157 and the valve controls conventionally the displacement of a servo piston. Servomotor 157 through its output means 158 positions an elevator control surface of the craft and also through a subtransmission means 160 operates the slider of the servo follow up potentiometer 161. Thus, by means of the feedback through the bypassed network 162, the elevator surface 159 is given a proportional plus integral displacement in accordance with the various types of input control signals derived from the vertical gyro 51, the Mach sensor 121, the pitch rate gyro 140, and the normal accelerometer 147. This servo control is represented by the block 97 of FIGURE 4 previously described.

Operationally, the Mach error mode is obtained by having the moving craft at the desired pitch attitude and desired Mach at which time the switch 131 may be moved to closed position to energize the winding for clutch 122 thereby operatively connecting Mach sensor 121 to the other winding 124. The Mach error signal from potentiometer 130 supplies the long term correction to maintain the desired Mach. Further the signal based upon Equation 10 with the gain values of $K_1$, $K_2$, and $K_3$ as determined from Equations 17, 18 provides a short term or damping effect in accordance with $\dot{M}$ or Mach rate. The Mach rate and Mach error signals are supplemented by lagged normal acceleration and high passed pitch rate signals. The lagged normal acceleration signal is used as stated in lieu of pitch attitude as an inner loop control. Pitch attitude, as evident from FIGURES 1 and 3 is used only in the computation of Mach rate $\dot{M}$.

It will now be apparent that we have provided a novel control system functioning during the Mach hold mode of the aircraft which control system includes a Mach rate effect obtained by blending the Mach error signal from Mach sensor 121 and the pitch attitude signal from vertical gyro 51.

What is claimed is:

1. In apparatus for operating an elevator control surface of an aircraft and providing a Mach hold control therefor comprising:
pitch attitude control signal providing means;
selected Mach error control signal providing means;
means modifying said Mach error signal in accordance with a gain factor $K_1$;
means combining said pitch attitude signal and said modified Mach error signal including means cancelling steady state values of the combined signals;
means modifying the combined signals by a gain factor $K_2$;
means also and additionally modifying the Mach error signal by a gain factor $K_3$;
and further means combining the additionally modified Mach error signal and the modified combined signal and providing an output in accordance therewith.

2. The apparatus of claim 1; including
means including a device sensing craft vertical acceleration supplying a normal acceleration control signal;
and means algebraically combining the signal from the further means and the normal acceleration control signal and operating the elevator surface.

3. Means for providing a signal $e_{0_2}$ including Mach error and Mach rate effects comprising:
first means for providing a pitch attitude signal;
second means providing a Mach error signal;
third means modifying said Mach error signal by a gain factor $K_1$;
fourth means combining the modified Mach error and pitch attitude signals;
fifth means connected to the fourth means cancelling steady state combined signals;
sixth means modifying said combined signal in accordance with a gain factor $T_2$;
seventh means also and additionally modifying said Mach error signal in accordance with the gain factor $K_3$;
and eighth means summing the output from the gain device $K_2$ and the gain device $K_3$ and provides a signal wherein the dimensions of $$K_3 = \frac{\text{Mach}}{\text{Mach}}$$

the dimension of $K_2$ is Mach per degree;
and the dimension of $K_1$ equals degrees per Mach.

4. The apparatus of claim 3 wherein the fifth means cancelling steady state values of said combined signal is an integrator having a transfer function $$\frac{1}{3S}$$

and having its output opposing the combined signals.

5. Means for computing a Mach hold control signal $e_{0_1}$ having a Mach error and Mach rate control component comprising means supplying a signal in accordance with the Mach error of the craft;
means providing a signal in accordance with pitch attitude;
means modifying the pitch attitude signal in accordance with a gain quantity to convert the pitch attitude signal to a Mach rate effect signal including means comprising a high pass network having a transfer function $$\frac{3S}{1+3S}$$

means modifying the Mach error signal in accordance with a high pass network having the transfer function $$\frac{S}{1+3S}$$

means for adding the outputs from the two high pass networks to provide a resultant;
means modifying the resultant from the sum of said high pass network signals by a gain factor $T_2$;
and further means adding the output of the gain device with the Mach error signal.

6. In flight control apparatus for an aircraft having an elevator surface for changing craft pitch attitude and servo means operating said elevator, means for controlling said servomotor by a signal having Mach error and Mach rate components comprising:
means providing a signal in accordance with the Mach error of the craft from a desired speed;
means providing an A.C. signal in accordance with the pitch attitude of the craft;
means receiving said attitude signal comprising a high pass network having a transfer function $$\frac{3S}{1+3S}$$

and supplying an output;
means modifying the Mach error signal in accordance with a high pass network having a transfer function $$\frac{S}{1+3S}$$

means providing a sum by adding the outputs of the two high pass networks;
a gain device $T_2$ modifying the sum and supplying an output;
and means combining the last output for the Mach error signal to provide said source of signal.

7. In flight control apparatus having a pitch attitude changing device and motor means operating said device, apparatus for controlling said motor means in a Mach hold mode comprising:
means sensing pitch attitude of the aircraft and providing a first A.C. signal;
means providing a Mach error A.C. signal;
means combining the pitch attitude and Mach error signal and supplying a resultant A.C. signal;
motor operated means responsive to said resultant A.C. signal and cancelling steady state values thereof;
means combining the resultant A.C. signal with an A.C. Mach error signal and controlling said servo means whereby the cancelling means permits change in craft pitch attitude and also provides for a Mach rate effect on said servo means.

References Cited by the Examiner
UNITED STATES PATENTS
2,973,927   3/61   Miller _____ 244—77
3,023,616   3/62   Miller _____ 244—77 X FERGUS S. MIDDLETON, *Primary Examiner.*
RALPH DAVID BLAKESLEE, *Examiner.*